H. L. Pierce,
Belt Hook.

No. 89,499.    Patented Apr. 27, 1869.

Inventor:
H. L. Pierce
by his attorney
A. Pollok

Witnesses:
M. Bailey
Wm. H. McCabe

HORATIO L. PEIRCE, OF TAUNTON, MASSACHUSETTS.

Letters Patent No. 89,499, dated April 27, 1869.

IMPROVED BELT-HOOK.

The Schedule referred to in these Letters Patent and making part of the same.

*To whom it may concern:*

Be it known that I, HORATIO L. PEIRCE, of Taunton, in the county of Bristol, and State of Massachusetts, have invented certain new and useful Improvements in Metallic Belt-Fasteners; and I hereby declare the following to be a full, clear, and exact description of the same.

To enable others skilled in the art to make and use my invention, I will now proceed to describe the same as fully and clearly as possible.

Many metallic contrivances have been devised to fasten belts together, and save the lacings of leather, which are almost invariably cut or spoiled in tightening or splicing the belt.

Among them are the rivet and burr, too common to require a description, the hook, and the arrow-headed fastener.

The hook-fastener is objectionable, because the ends of the hooks, though pounded down after the belt is put together with them, often rise up, and, in case of cross-belts, soon seriously injure the belt, and often inflict serious injury to the operatives while turning the belt from the fast to the loose pulley, or *vice versa*. They are seldom fit for use but once; *i. e.*, when a belt is put together with them once, it cannot always be tightened by the use of the same hooks.

The same objections, to a greater or less degree, attend the arrow-headed fastener.

Figure 1:
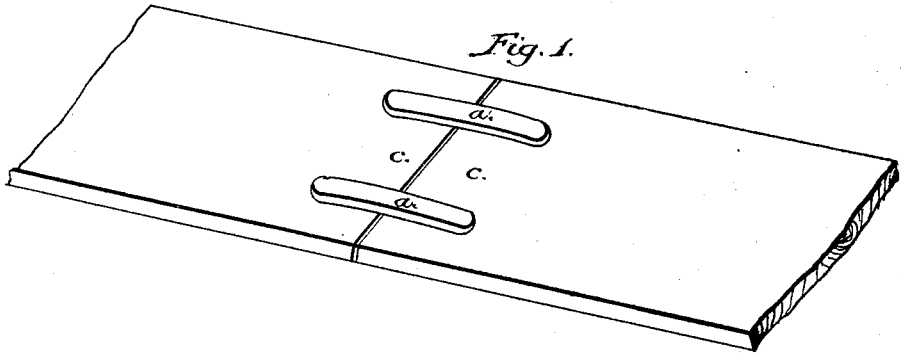
Figure 2:
Figure 3:
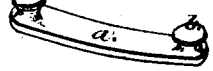

These objections are obviated in the belt metallic button-fastener which I have devised, and which is illustrated in Figures 1, 2, and 3 of the accompanying drawings.

It may be described as a smooth oval, or rounded bar of metal, *a*, of the required length, slightly curved, upon the inner side of which, and at each end, and forming part of the fastener, is a button, *b*, the shanks of which are nearly equal in length to the thickness of the belt *c*, to which it is to be applied as a fastener. In using it, proper holes, in the right places, are made in the belt, and the buttons are inserted much in the same manner that a shirt-collar is fastened with a "shirt-stud."

The face of the buttons comes even with the surface of the belt, which runs on the surface of the pulley, and in smoothness resembles the head of a rivet, while the bar connecting the two buttons is on the outside of the belt, and soon curves, whatever its curvature may have originally been, to the curve or circumference of the pulley on which it runs.

This fastener may be made of brass or other composition metals, of malleable or wrought-iron.

It can be used more frequently than any other fastener, without injury to it in any way, and to become valueless as a fastener it must be worn out.

Having described my invention,

What I claim, and desire to secure by Letters Patent, is—

A fastener for belting and banding, consisting of a connecting-bar combined with two buttons, the axes of the shanks of which are at right angles to the bar, as described, the faces of said buttons, when applied to the belting, being about flush with, and so as not to project from the inner surface of the same, as and for the purposes set forth.

In testimony whereof, I have signed my name to this specification, before two subscribing witnesses.

HORATIO L. PEIRCE.

Witnesses:
   N. D. ARNOLD,
   GEO. F. WILSON.